United States Patent
Lai et al.

(10) Patent No.: US 9,453,306 B2
(45) Date of Patent: Sep. 27, 2016

(54) AUTOMATED MOLDING MACHINE FOR ULTRA SMALL DRAFT ANGLE SLURRY MOLDING PRODUCTS

(71) Applicants: Tzung-Shen Lai, Yilan (TW); Jian-Fang Chen, Guangdong (CN)

(72) Inventors: Tzung-Shen Lai, Yilan (TW); Jian-Fang Chen, Guangdong (CN)

( * ) Notice: Subject to any disclaimer, the term of this patent is extended or adjusted under 35 U.S.C. 154(b) by 290 days.

(21) Appl. No.: 14/246,179

(22) Filed: Apr. 7, 2014

(65) Prior Publication Data

US 2015/0267353 A1    Sep. 24, 2015

(30) Foreign Application Priority Data

Mar. 19, 2014    (TW) .............................. 103110251 A (51) Int. Cl.
*D21J 3/00*        (2006.01)
*B28B 1/26*        (2006.01)
*B29C 41/16*       (2006.01)

(52) U.S. Cl.
CPC ............... *D21J 3/00* (2013.01); *B28B 1/261* (2013.01); *B28B 1/265* (2013.01); *B29C 41/16* (2013.01)

(58) Field of Classification Search
CPC ............... B29C 41/16; B29C 43/36; B29C 2043/3222; B29C 2043/043; B28B 1/261; B28B 1/265; B28B 1/28; D21J 3/00
USPC ........................................................ 425/85
See application file for complete search history.

(56) References Cited

U.S. PATENT DOCUMENTS

| | | | | |
|---|---|---|---|---|
| 2,149,595 A | * | 3/1939 | Fulton | B28B 1/261 264/256 |
| 2,222,003 A | * | 11/1940 | Sloan | A42C 1/04 162/378 |
| 2,225,134 A | * | 12/1940 | Skolnik | D21J 1/00 162/227 |
| 2,234,979 A | * | 3/1941 | Emery | D21J 3/00 162/219 |
| 2,471,932 A | * | 5/1949 | Chaplin | D21J 3/00 162/188 |
| 2,663,230 A | * | 12/1953 | Wagner | D21J 3/00 162/410 |
| 2,746,358 A | * | 5/1956 | Emery | D21J 3/00 162/392 |
| 2,961,042 A | * | 11/1960 | Wolter | D21J 3/00 162/394 |
| 3,147,180 A | * | 9/1964 | Berardino | D21J 3/00 162/380 |

(Continued)

*Primary Examiner* — Alison L Hindenlang
*Assistant Examiner* — Emmanuel S Luk
(74) *Attorney, Agent, or Firm* — Alan D. Kamrath; Kamrath IP Lawfirm, P.A.

(57) ABSTRACT

In an automated molding machine for ultra small draft angle slurry molding products, a righting gear of a righting mechanism drives a turning mechanism to perform a turnover action to assist righting an ascending or descending action along a righting rack of a righting shaft synchronously. When a slurry suction die is moved up and down and/or turned over, the slurry suction die can be ascended to a designated position through the righting provided by the righting gear and the righting rack to achieve a precise closing when the slurry suction film is carried, ascended and closed with an extrusion die or descended and closed with a moving mold. Meanwhile, the extrusion die is controlled by a power cylinder to perform a descending stroke and close the mold with the slurry suction die.

7 Claims, 9 Drawing Sheets

(56) References Cited

U.S. PATENT DOCUMENTS

| | | | | |
|---|---|---|---|---|
| 3,838,001 A * | 9/1974 | Greiner et al. | ............ | D21J 3/00 100/110 |
| 4,289,793 A * | 9/1981 | Gustafson | ................ | A01J 25/12 100/107 |
| 4,994,148 A * | 2/1991 | Shetka | ....................... | D21J 3/00 162/227 |
| 5,104,598 A * | 4/1992 | Dolle | ........................ | B28B 1/38 162/227 |
| 5,120,211 A * | 6/1992 | Ito | ............................. | B28B 1/26 264/86 |
| 5,198,167 A * | 3/1993 | Ohta | ....................... | B29C 43/14 162/152 |
| 5,399,243 A * | 3/1995 | Miyamoto | ................ | D21J 7/00 162/199 |
| 5,660,863 A * | 8/1997 | Nakano | ..................... | B28B 3/02 425/420 |
| 6,048,440 A * | 4/2000 | Baker | ....................... | D21J 7/00 162/388 |
| 6,210,531 B1 * | 4/2001 | Bradford | ................. | B29C 43/56 162/218 |
| 6,250,369 B1 * | 6/2001 | Cassani | ................... | B28B 1/265 164/341 |
| 6,332,956 B1 * | 12/2001 | Lee | ........................... | D21J 3/00 162/378 |
| 6,352,617 B1 * | 3/2002 | Lee | ........................... | D21J 7/00 162/218 |
| 2007/0227680 A1 * | 10/2007 | Kim | ........................ | B31D 5/02 162/218 |
| 2009/0025898 A1 * | 1/2009 | Petroski | ................... | D21J 3/00 162/218 |
| 2012/0276400 A1 * | 11/2012 | Nilsson | ..................... | D21J 3/00 428/537.1 |
| 2016/0009001 A1 * | 1/2016 | Moore | ..................... | B28B 1/28 264/87 |

* cited by examiner

AUTOMATED MOLDING MACHINE FOR ULTRA SMALL DRAFT ANGLE SLURRY MOLDING PRODUCTS

BACKGROUND OF THE INVENTION

1. Field of the Invention

The present invention relates to an automated molding machine for ultra small draft angle slurry molding products and, more particularly, to the automated molding machine for ultra small draft angle slurry molding products that descends an extrusion die to one stroke to match and mold with a slurry suction die, to achieve the effect of molding the slurry suction die with the extrusion die precisely at a designated position.

2. Description of the Related Art

At early stages, most industrial and household products were made of plastic. Later studies show that plastic products may release toxins to cause severe pollution to the environment, and it is difficult to recycle, reuse or decompose plastic products, thus resulting in a high recycling cost. Unfortunately, there is a huge amount of plastic products which has seriously damaged our environmental protection for years. In today's high level of environmental consciousness, developing non-toxic and recyclable materials becomes a mainstream of research and practical applications.

At present, a mixture of slurry and/or plant fiber is developed. A slurry suction die of a slurry molding product molding machine is used for slurry suction, then pressed and molded with an extrusion die, and finally hot-pressed to produce the product. This product is generally called a "molding product" or a "paper-plastic product" in order to have a clear distinction from the term and definition of a "plastic product". The molding products made of the mixed material of slurry and/or plant fiber can be recycled and reused easily, so that they comply with the energy saving, carbon reduction, and environmental protection requirements. The molding products have become increasingly more important and popular in industrial, commercial and public areas.

The manufacture of molding products requires "slurry suction molding" and "hot press truing" processes, so that the conventional molding machine for manufacturing the molding products is equipped with devices for performing both slurry suction molding process and hot press truing process. The device used for the slurry suction molding process includes a main frame, a slurry box disposed at the bottom of the main frame, an up-and-down movable frame, and a slurry suction die disposed on the frame. The slurry suction die faces downwardly and remains at an initial position when the operation of the slurry suction molding device stops, and descends outwardly from the frame by external power when the operation of the slurry suction molding device starts. The slurry suction die is linked to descend one stroke and enter into the slurry box for performing a vacuum suction of the slurry through a plurality of slurry suction holes on the surface of the slurry suction die by using an external vacuum device to form a full slurry layer on a surface of the slurry suction die. Then, the frame is ascended to link and drive the slurry suction die together with the slurry layer to separate from the slurry box and ascend back to its original position. In the process, the slurry layer will gradually lower its humidity when the vacuum suction continues. While the frame is ascending, a turning mechanism installed on the frame drives the frame (together with the slurry suction die and the slurry layer) to be overturned. The slurry suction die and the slurry layer face upwardly and continue to move upwardly for one stroke and close with an extrusion die disposed at the top inside the main frame, so that the slurry layer is extruded (compressed) and molded into a blank. Since there is a space between the slurry suction die and the extrusion die, since the space is the profile of the expected molding product, and after the slurry suction die and the extrusion die jointly extrude (compress) the slurry layer, the molded blank becomes a blank similar to the expected molding product, but the blank is an intermediate product with a relatively high humidity. Then, the frame (together with the slurry suction die and the attached blank) is driven to descend, so that the slurry suction die and the blank are separated from the extrusion die, to complete the "slurry suction molding" process.

Now, it is necessary to perform the "hot press truing" process before the blank becomes the final molding product. A side frame is mounted on a side of the main frame, and a moving device has a hot-press lower mold (which is the moving mold) equipped with another vacuum device. The hot-press lower mold (which is the moving mold) of the moving device is moved a position exactly below the slurry suction die and the blank. The frame drives the slurry suction die and the blank to descend, and the blank is put into the hot-press lower mold (which is the moving mold). Then, the vacuum of the slurry suction die stops, and an air-blowing operation is performed. In the meantime, the suction of the hot-press lower mold (which is the moving mold) starts to suck the blank, and the frame drives the slurry suction die to ascend to its original position (Now, the blank has been transferred onto the moving mold). While the hot-press lower mold (which is the moving mold) is moved to a position exactly below a hot-press upper mold disposed at the top inside the side frame, the hot-press upper mold is driven by another external power to descend and close with the hot-press lower mold (which is the moving mold), and the heater is turned on to heat the blank and perform the hot press truing process. In the meantime, the vacuum suction force of the hot-press lower mold is maintained to facilitate extracting and sucking the steam quickly, to achieve a quick drying effect of the blank. This process not just dries the blank completely, but also shapes the blank. After the hot press truing process is completed, the original blank is converted into the molding product. Then, the heating of the hot-press upper mold is stopped, and the hot-press upper mold is ascended to its original position. In the meantime, the moving mold attaches and carries the molding product to move towards the outside of the side frame, and the molding product is collected.

The conventional molding machine used for manufacturing the molding product has a major shortcoming that it is difficult to control the turnover action of the turning mechanism. During the operation, a failure or an overturn may occur. In addition, the up-and-down movements of the frame are driven by external power (which is generally from a power cylinder), and there is no other mechanism for righting or aligning in the stroke. Thus, when the ascending or descending action reaches a fixed point, a deviation or a failure of aligning parallelly to the slurry suction die board may occur. When the slurry suction die is driven to ascend and close with the extrusion die or driven to descend to close with the moving mold, an unmatched mold closing occurs frequently. Therefore, a shutdown is required for making adjustments and corrections. The frequent occurrence of unmatched mold closing results in a low yield rate, wastes manufacturing time and labor, and incurs a very high manufacturing cost.

In another conventional molding machine for manufacturing molding products, the extrusion die is placed at a fixed position on the top inside the main frame. The slurry suction die is moved upwardly for one stroke and engaged with the extrusion die to extrude (compress) the slurry layer to shape a blank. Thus, if the slurry suction die moves one stroke calculated by using the initial position as the initial point, it is necessary to calculate the stroke of moving downwardly into the slurry box and then moving upwardly back to its original position as well as calculating the stroke of moving upwardly to close mold with the extrusion die and then moving downwardly to its original position. In other words, for the conventional slurry suction die for each time of molding a blank, it is necessary to have a stroke of moving downwardly→upwardly→upwardly→downwardly, and thus wasting the manufacturing time and incurring a high manufacturing cost. Obviously, the conventional molding machines require further improvements.

SUMMARY OF THE INVENTION

In view of the foregoing drawbacks of the prior art, an automated molding machine for ultra small draft angle slurry molding products was designed and developed in accordance with the present invention to overcome the drawbacks of the prior art.

Therefore, it is a primary objective of the present invention to provide an automated molding machine for ultra small draft angle slurry molding products capable of moving the slurry suction die to a designated position and closing with the extrusion die precisely.

Another objective of the present invention is to provide an automated molding machine for ultra small draft angle slurry molding products, with a power cylinder provided for pushing an extrusion die to move downwardly for a stroke and closing with the ascending slurry suction die in order to waive the stroke of moving the slurry suction die.

A further objective of the present invention is to provide an automated molding machine for ultra small draft angle slurry molding products with the effects of reducing the manufacturing time and labor, lowering the manufacturing cost, and improving the yield rate and the product competitiveness.

To achieve the aforementioned and other objectives, the present invention provides an automated molding machine for ultra small draft angle slurry molding products comprising: a main frame, a side frame disposed on a side of the main frame, first means installed in the main frame for performing a slurry suction molding process, and second means installed in the side frame for performing a hot press truing process. A blank is formed after the slurry suction molding process is completed in the main frame, and then the blank is sent into the side frame for the hot press truing process, to manufacture a molding product. The main frame has a top board, a working board, and a plurality of equidistant columns disposed between the top board and the working board for supporting and fixing the distance between the top and working boards to form an action space between the top board and the working board. Plural support columns are disposed on both front and rear sides of the action space respectively. A front action base is passed between the front support columns, and a rear action base is passed between the rear support columns. The working board has a hollow space at the top of the plurality of equidistant columns and a slurry box at the top of the plurality of equidistant columns. A turning mechanism is mounted on an action plate fixed to the front side of the front action base, and the turning mechanism includes a power supply and a speed reducer installed on the action plate. The output shaft of the speed reducer is passed into the front action base, and forces are outputted from an output gear. An action frame is accommodated in the action space defined by the top board, the working board and the front and rear action bases, and the action frame includes a rotary shaft capable of rotating in forward and backward directions. Both front and rear ends of the rotary shaft are passed into the front and rear action bases and supported. A passive gear is installed at the front end of the rotary shaft and engaged with the output gear inside the output gear for outputting forces to drive and rotate the rotary shaft and the action frame. Each of the front and rear sides of the action frame is a panel having a symmetrical accommodating arc slot formed thereon, and the accommodating arc slots are formed in an arc shape by using the rotary shaft as the center axis. A slurry suction die is disposed on a surface on the panels of the first and rear sides of the action frame for guiding a vacuum suction force, and a balance weight is disposed on another surface of the first and rear sides of the action frame and configured in a same forward and backward directions and at an installation position having an angle of inclination with respect to the rotary shaft. A righting mechanism installed on the front and rear action bases and a support column includes a righting shaft on a side. The shaft body is passed through the front and rear accommodating arc slots of the front and rear sides of the action frame, and both ends of the shaft body are disposed at the front and rear action bases respectively. A righting gear is installed separately at both ends of the shaft body, and a righting rack in a vertical direction is disposed at the support column on a same side and faces a surface of the righting gear. Each righting gear is engaged with the corresponding righting rack. When the front and rear action bases are driven to descend or ascend, the righting gears are also driven to descend or ascend synchronously. An extrusion die is installed in an action space defined by the top board, the working board and the front and rear action bases and disposed at a position adjacent to the top board.

The automated molding machine for ultra small draft angle slurry molding products further comprises a front power cylinder and a rear power cylinder installed on a top surface of the top board. The front and rear power cylinders have cylinder shafts passing downwardly through the top board and then coupled to the front and rear action bases respectively. When the cylinder shafts of the front and rear power cylinders are extended or retracted synchronously, the front and rear action bases are driven to perform a descending or ascending action along the front and rear sides of the support column synchronously to achieve the effect of controlling the action frame to descend or ascend.

The automated molding machine for ultra small draft angle slurry molding products further comprises a motor device for rotating the righting shaft in a forward or backward direction and linking the righting gears to rotate, so that the righting gears are ascended or descended along the righting shaft to achieve the effect of controlling the action frame to descend or ascend.

In the automated molding machine for ultra small draft angle slurry molding products, the motor device is a power supply equipped with a speed reducer.

In the automated molding machine for ultra small draft angle slurry molding products, the extrusion die the extrusion die is coupled to a cylinder shaft of a power cylinder, and the power cylinder is installed at a top surface of the top board. The cylinder shaft of the power cylinder is passed downwardly through the top board and then coupled to the extrusion die to achieve the effect of controlling the extrusion die to descend or ascend.

In the automated molding machine for ultra small draft angle slurry molding products, a vacuum suction force is introduced to a surface of the extrusion die.

In the automated molding machine for ultra small draft angle slurry molding products, the extrusion die includes a heater capable of providing a heating effect.

DETAILED DESCRIPTION OF THE PREFERRED EMBODIMENTS

The technical characteristics, contents, advantages and effects of the present invention will be apparent with the detailed description of preferred embodiments accompanied with related drawings as follows.

Figure 1:
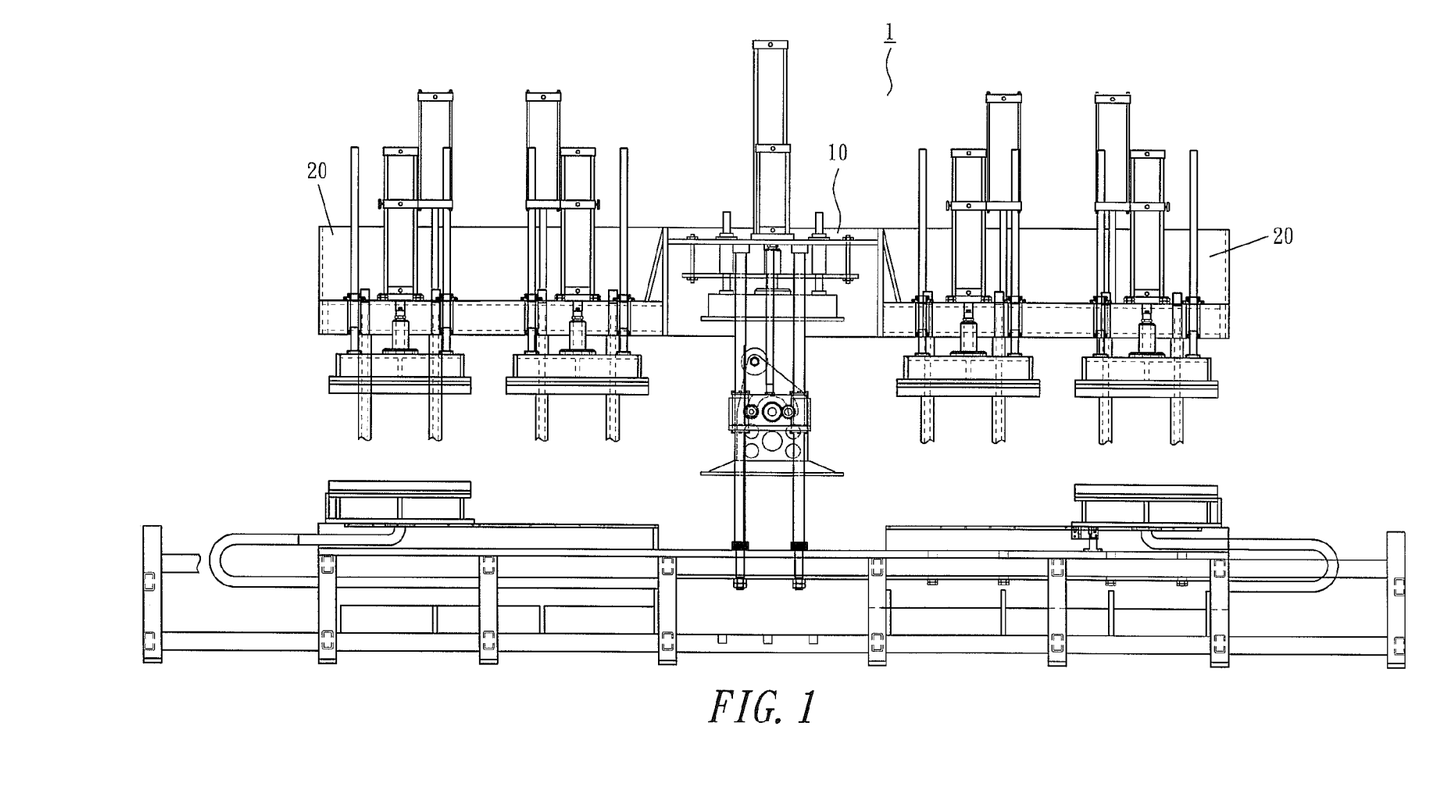
FIG. 1 is a schematic view of an assembly of a preferred embodiment of the present invention.

With reference to FIG. 1 for an automated molding machine 1 for manufacturing molding products in accordance with a preferred embodiment of the present invention, the molding machine 1 is specially applicable for manufacturing ultra small draft angle molding products, and the molding machine 1 comprises a main frame 10, a side frame 20 disposed separately on both sides of the main frame 10, and a means installed in the main frame 10 for performing a slurry suction molding process, and installed in a side frame 20 for performing a hot press truing process. In other words, blanks can be molded in the main frame 10 after the slurry suction molding process is completed, and then sent towards the right or left side into the side frame 20 sequentially for performing the hot press truing process in order to manufacture the molding product.

Figure 2:
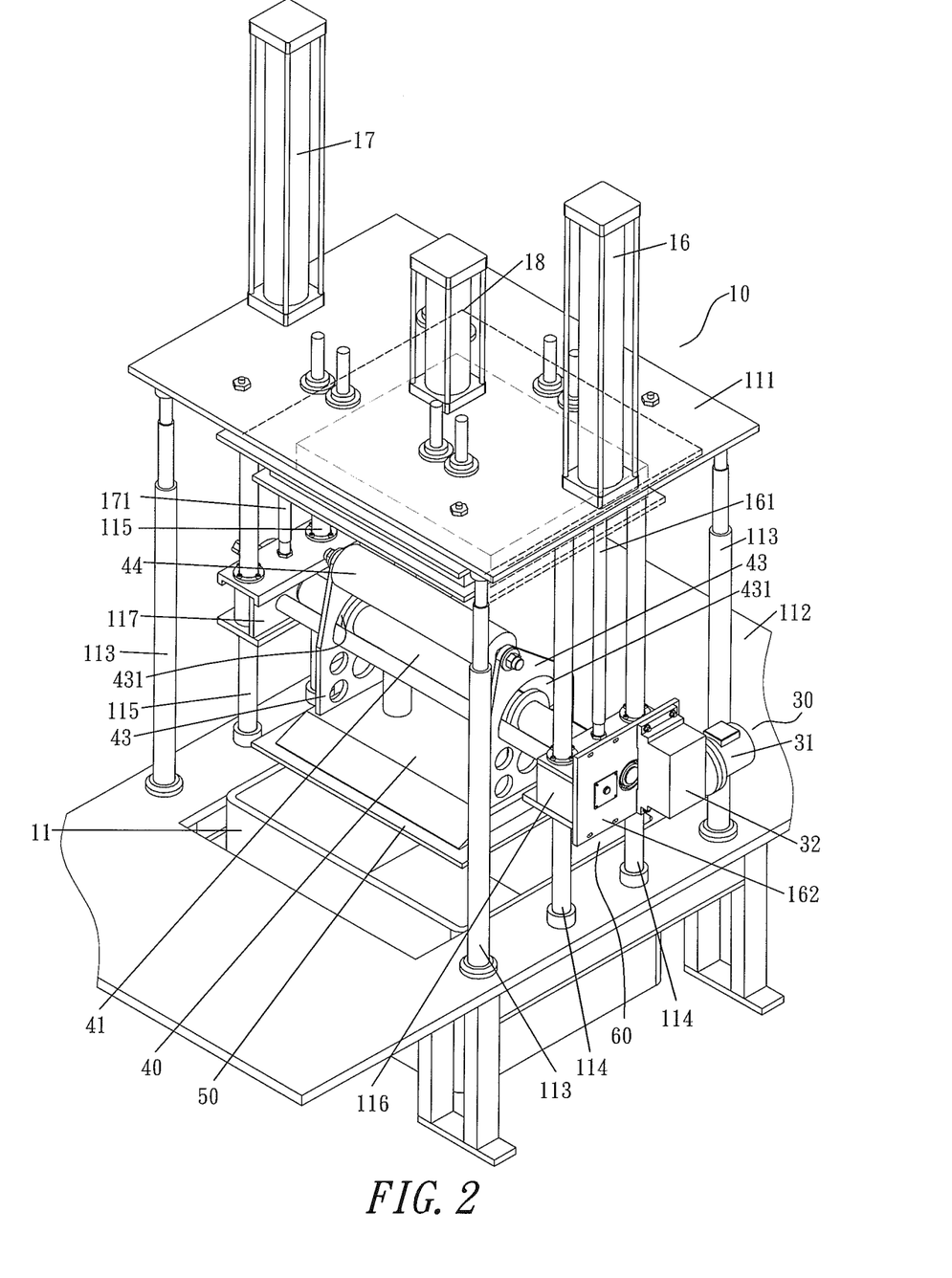
FIG. 2 is a perspective view of an assembly carrying out a slurry suction molding process in accordance with a preferred embodiment of the present invention.

In FIG. 2, plural equidistant columns 113 are disposed between the top board 111 and the working board 112 for supporting and fixing the distance between the top and the bottom to form an action space between the top board 111 and the working board 112. Plural (or two) front and rear support columns 114, 115 are disposed on both front and rear sides of the action space respectively. A front action base 116 is passed between the front support columns 114, and a rear action base 117 is passed between the rear support columns 115. The working board has a hollow space at the top of the equidistant columns and a slurry box at the top of the equidistant columns. The top of the front action base 116 is coupled to a cylinder shaft 161 of a front power cylinder 16, and the top of the rear action base 117 is coupled to a cylinder shaft 171 of a rear power cylinder 17. Both front and rear power cylinders 16, 17 are disposed on the top of the top board 111, and the cylinder shafts 161, 171 are passed through the top board 111 and then coupled to the front and rear action bases 116, 117 respectively, so that when the cylinder shafts 161, 171 of the front and rear power cylinders 16, 17 are extended (descended) or retracted (ascended) synchronously, the front and rear action bases 116, 117 are driven to descend or ascend along the front and rear sides support column 114 synchronously. In other words, the descending or ascending action of the front and rear action bases 116, 117 is controlled by the cylinder shafts 161, 171 of the front and rear power cylinders 16, 17, and the front and rear action bases 116, 117 is descended or ascended along the front and rear sides support column 114 synchronously, so that the up and down strokes are consistent, and so that the arrived upper and lower positions (which are known as upper and lower dead points) are also consistent.

Figure 3:
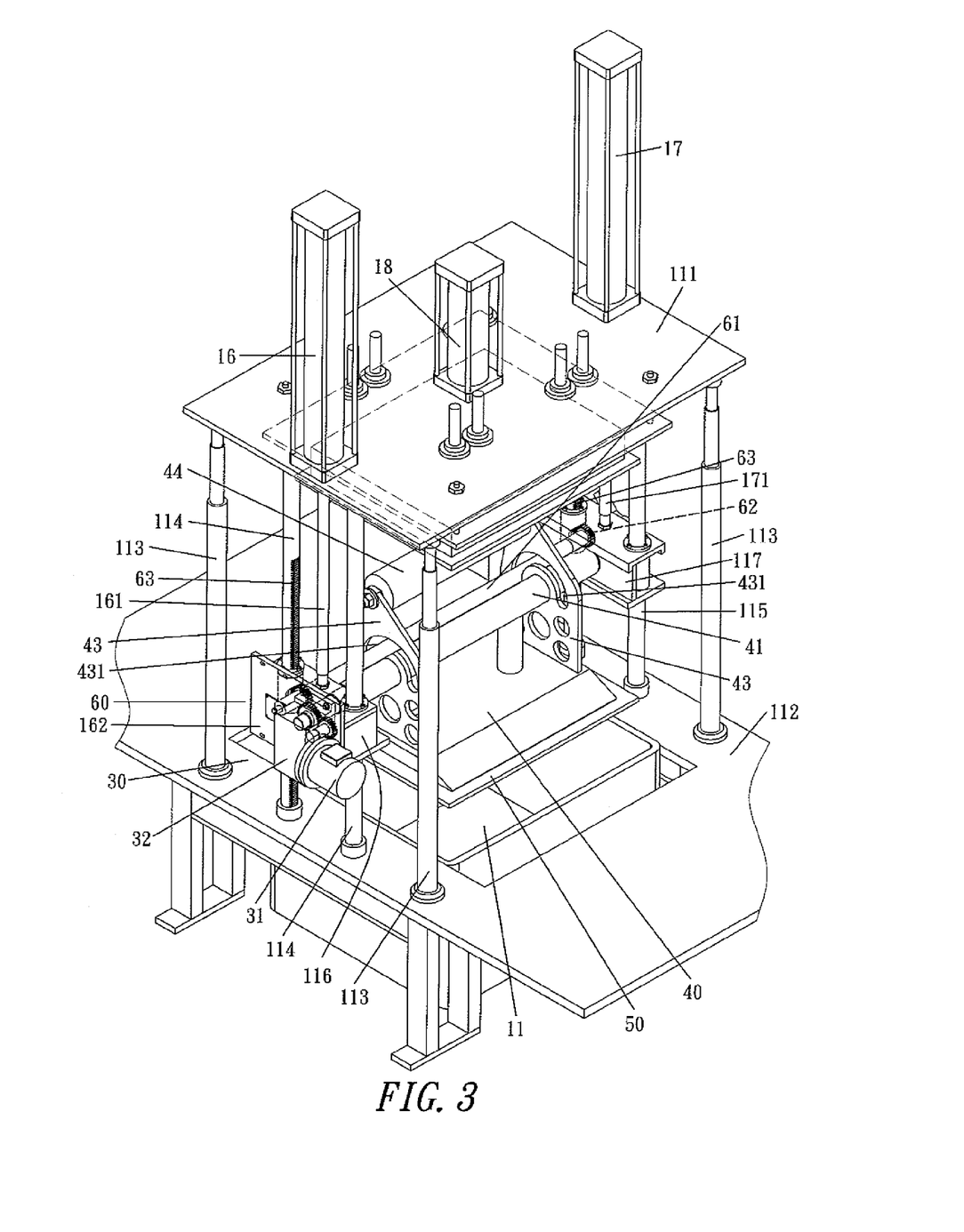
FIG. 3 is another perspective view of an assembly carrying out a slurry suction molding process in accordance with a preferred embodiment of the present invention.
Figure 4:
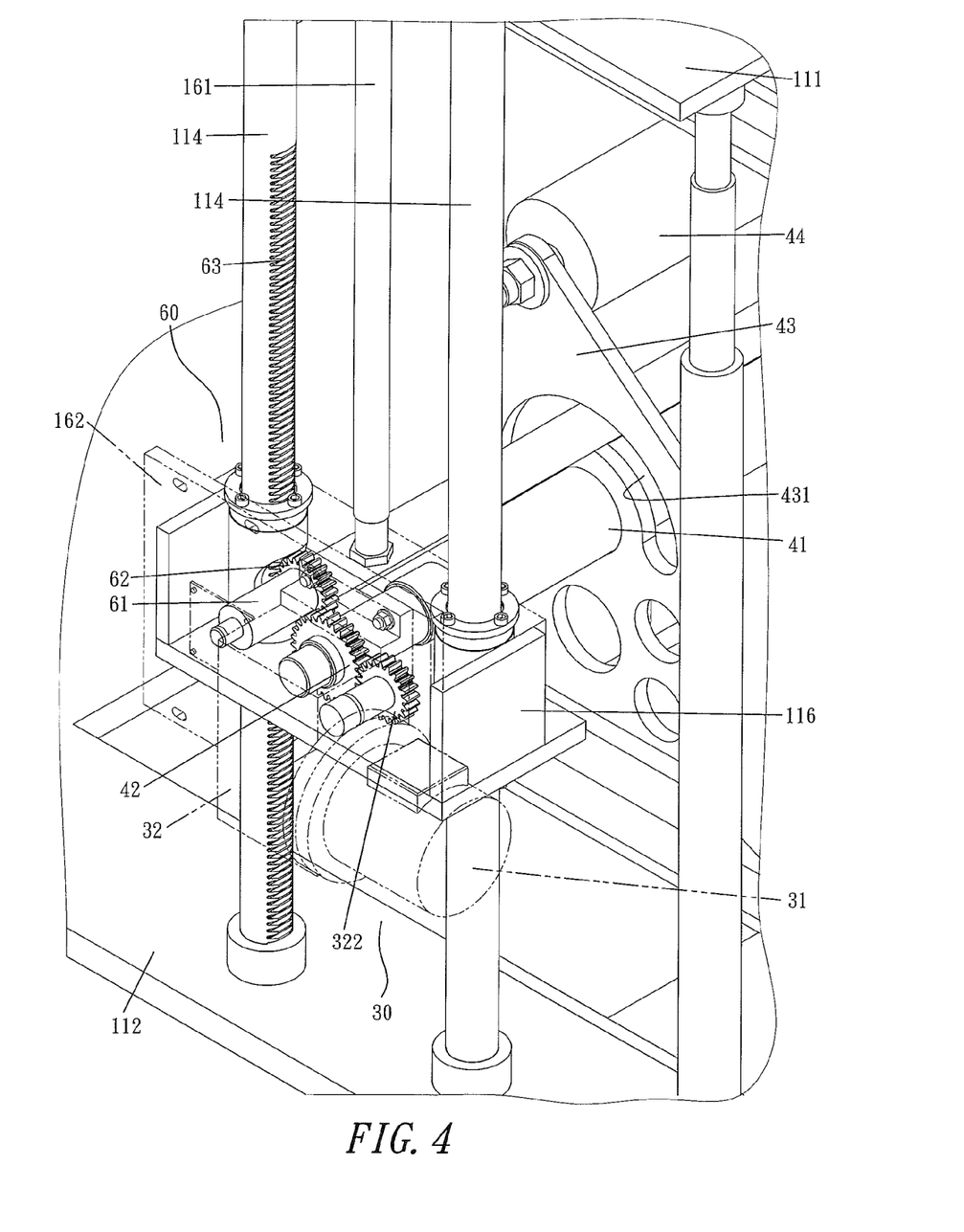
FIG. 4 is a partial blowup view of FIG. 3.

In FIGS. 2, 3 and 4, the working board 112 has a hollow formed between the equidistant columns 113 and a slurry box 11 disposed at the bottom of the working board 112. An action plate 162 is fixed to the front of the front action base 116. A turning mechanism 30 is mounted on the action plate 162 and includes a power supply 31 (such as a power motor) and a speed reducer 32 installed on the action plate 162. An output shaft 321 of the speed reducer 32 is passed into the front action base 116, and forces are outputted from an output gear 322. An action frame 40 is accommodated in the action space defined by the top board 111, the working board 112 and the front and rear action bases 116, 117. The action frame 40 includes a rotary shaft 41 capable of rotating in forward and backward directions, and both front and rear ends of the rotary shaft 41 are passed into the front and rear action bases 116, 117 respectively and supported. A passive gear 42 is installed at the front end of the rotary shaft 41, and engaged with the output gear 322 inside the front action base 116 (as shown in FIG. 4). Thus, when a force is outputted (to rotate the output gear 322), the passive gear 42 is driven to rotate and link the rotary shaft 41 and the action frame 40 to rotate together. Each of the front and rear sides of the action frame 40 is a panel 43 having a symmetrical accommodating arc slot 431 formed on the panel 43, and the accommodating arc slots 431 are formed in an arc shape by using the rotary shaft 41 as the center axis. A slurry suction die 50 is disposed on a surface on the same side of the panels 43 (for guiding a vacuum suction force). A balance weight 44 is disposed on the other side of the panels 43 and configured in forward and backward directions, and at an installation position having an angle of inclination with respect to the rotary shaft 41. A righting mechanism 60 is installed at the front and rear action bases 116, 117 and the support columns 114, 115 on a side and includes a righting shaft 61. The righting shaft 61 is passed through the front and rear accommodating arc slots 431 of the action frame 40, and both ends of the righting shaft 61 are disposed in the front and rear action bases 116, 117 respectively. A righting gear 62 is installed separately at both ends of the righting shaft 61, and a righting rack 63 in a vertical direction is disposed at the support columns 114, 115 on the same side and face a surface of the righting gear 62. Each righting gear 62 is engaged with the righting rack 63 (as shown in FIG. 4), so that when the front and rear action bases 116, 117 are driven to descend or ascend, the righting gears 62 is driven to descend or ascend synchronously and rotate along the righting rack 63 to assist the action frame 40 to descend or ascend to a consistent upper or lower position (also known as upper or lower dead point).

In FIGS. 2 and 3, an extrusion die 70 is installed in the action space defined by the top board 111, the working board 112 and the front and rear action bases 116, 117 and disposed at a position adjacent to the top board 111. The extrusion die 70 is controlled by a power cylinder 18, and the power cylinder 18 is installed at the top of the top board 111. The cylinder shaft 181 is passed downwardly through the top board 111 and then coupled to the extrusion die 70, so that when a cylinder shaft 181 of the power cylinder 18 is extended (descended) or retracted (ascended), the extrusion die 70 is driven to descend or ascend synchronously. A vacuum suction force is introduced to a surface of the extrusion die 70. In addition, the extrusion die 70 may include a heater to provide a heating effect.

Figure 5:
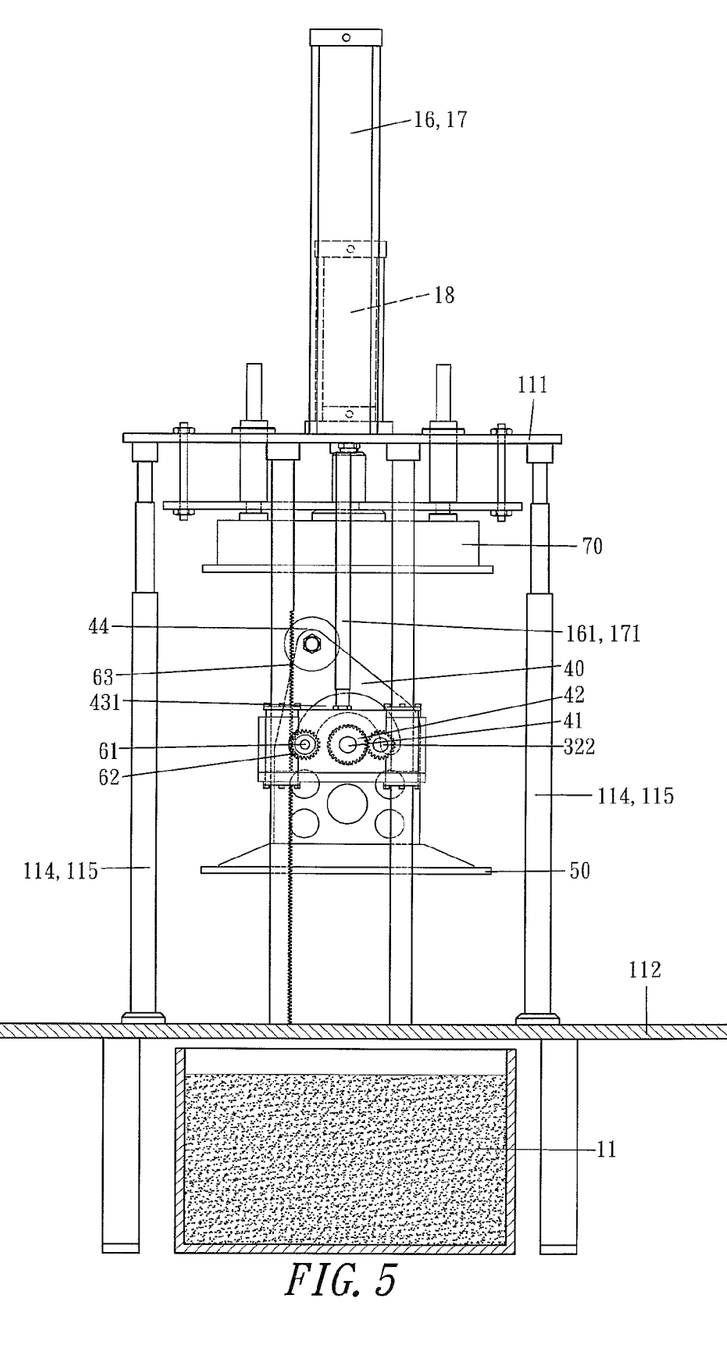
FIGS. 5 to 9 are schematic views showing a series of consecutive movements of an assembly carrying out a slurry suction molding process in accordance with a preferred embodiment of the present invention.
Figure 6:
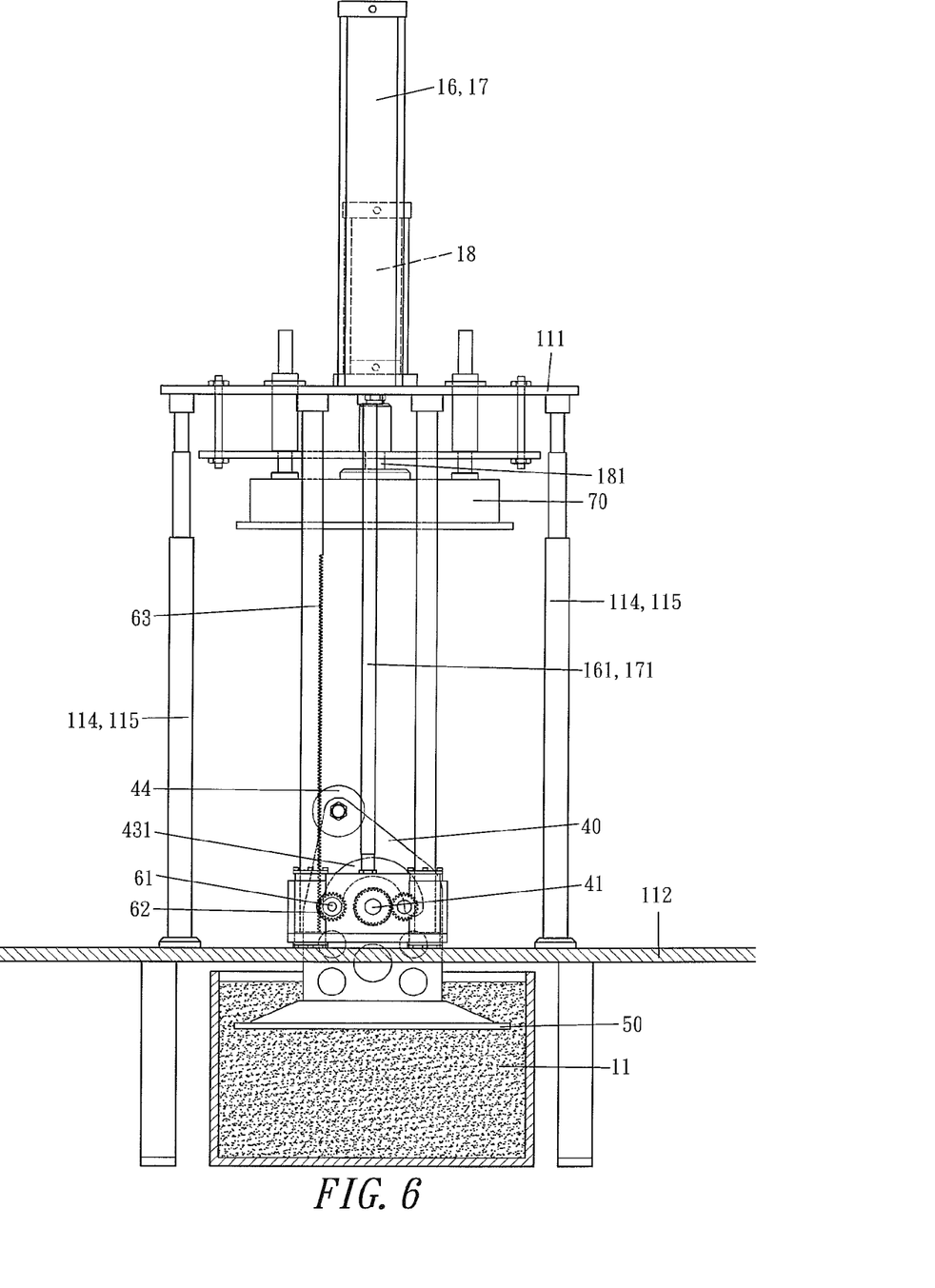
Figure 7:
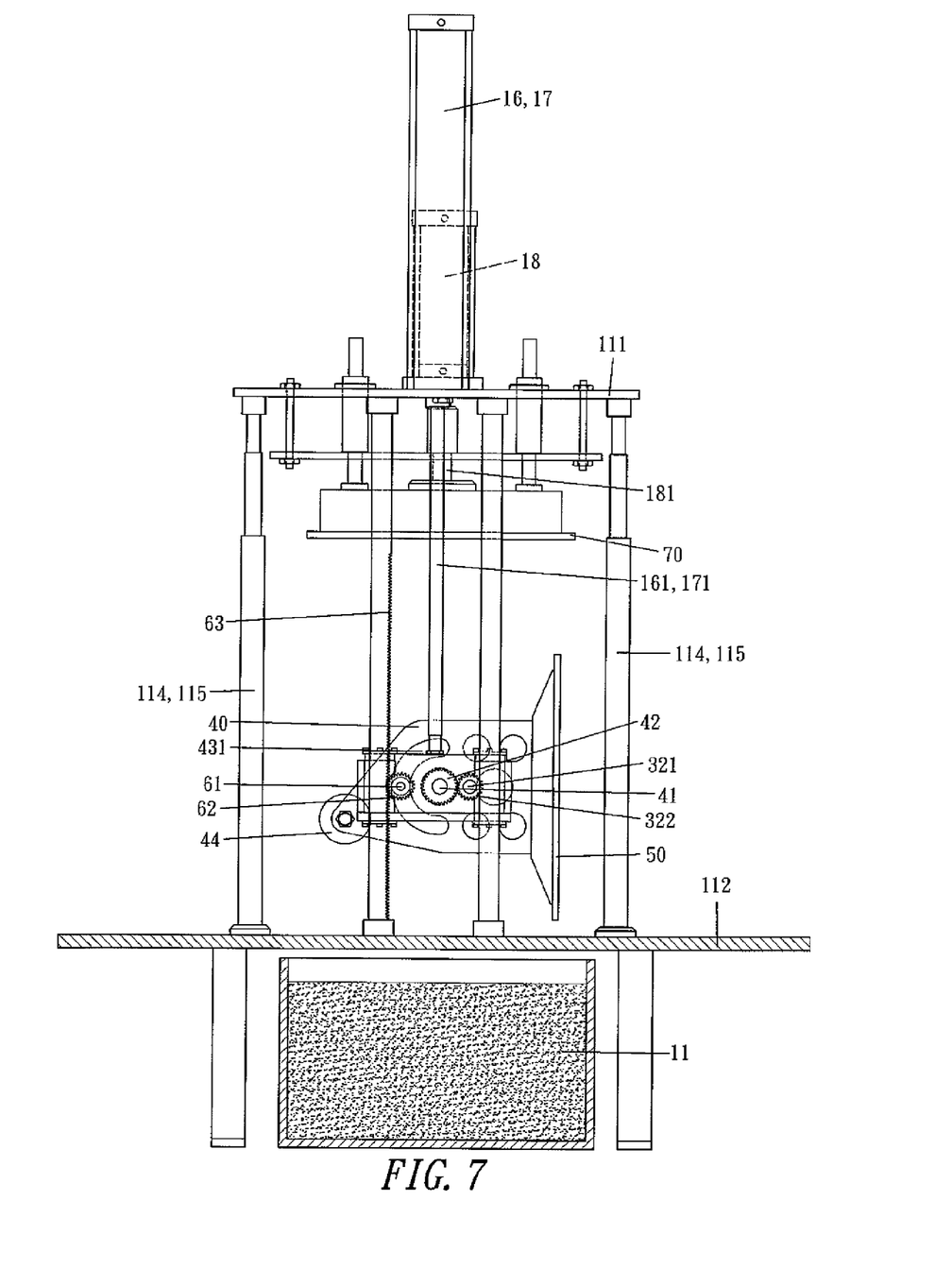

In the assembly as shown in FIG. 5, the action frame 40 remains at a standard position and the mold surface of the slurry suction die 50 faces downwardly, so that the balance weight 44 is disposed at the top. In FIG. 6, the cylinder shafts 161, 171 of the front and rear power cylinders 16, 17 are extended synchronously to drive the action frame 40 to descend, so that the slurry suction die 50 is entered into slurry box 11 for performing the slurry suction process, and so that a full slurry layer is attached onto a surface of the slurry suction die 50. In FIG. 7, the cylinder shafts 161, 171 of the front and rear power cylinders 16, 17 are retracted synchronously to drive the slurry suction die 50 of the action frame 40 and the slurry layer to ascend and leave the slurry box 11, and to turn on the power supply 31 of the turning mechanism 30 immediately. Through the speed reducer 32, a force is outputted from the output gear 322, so that when the passive gear 42 at the front end of the rotary shaft 41 is driven to rotate, the action frame 40 (including the rotary shaft 41, the balance weight 44, the slurry suction die 50 and the slurry layer) is rotated counterclockwise, and the accommodating arc slot 431 is rotated counterclockwise synchronously. However, the righting shaft 61 remains still in the process. Since the righting shaft 6f is driven to ascend, the righting gear 62 installed at an end of the righting shaft 61 ascends along the righting rack 63 and rotates. With respect to the accommodating arc slot 431, the righting shaft 61 remains still. In the process, the power cylinder 18 extends the cylinder shaft 181 to push the extrusion die 70 to descend for a stroke.

Figure 8:
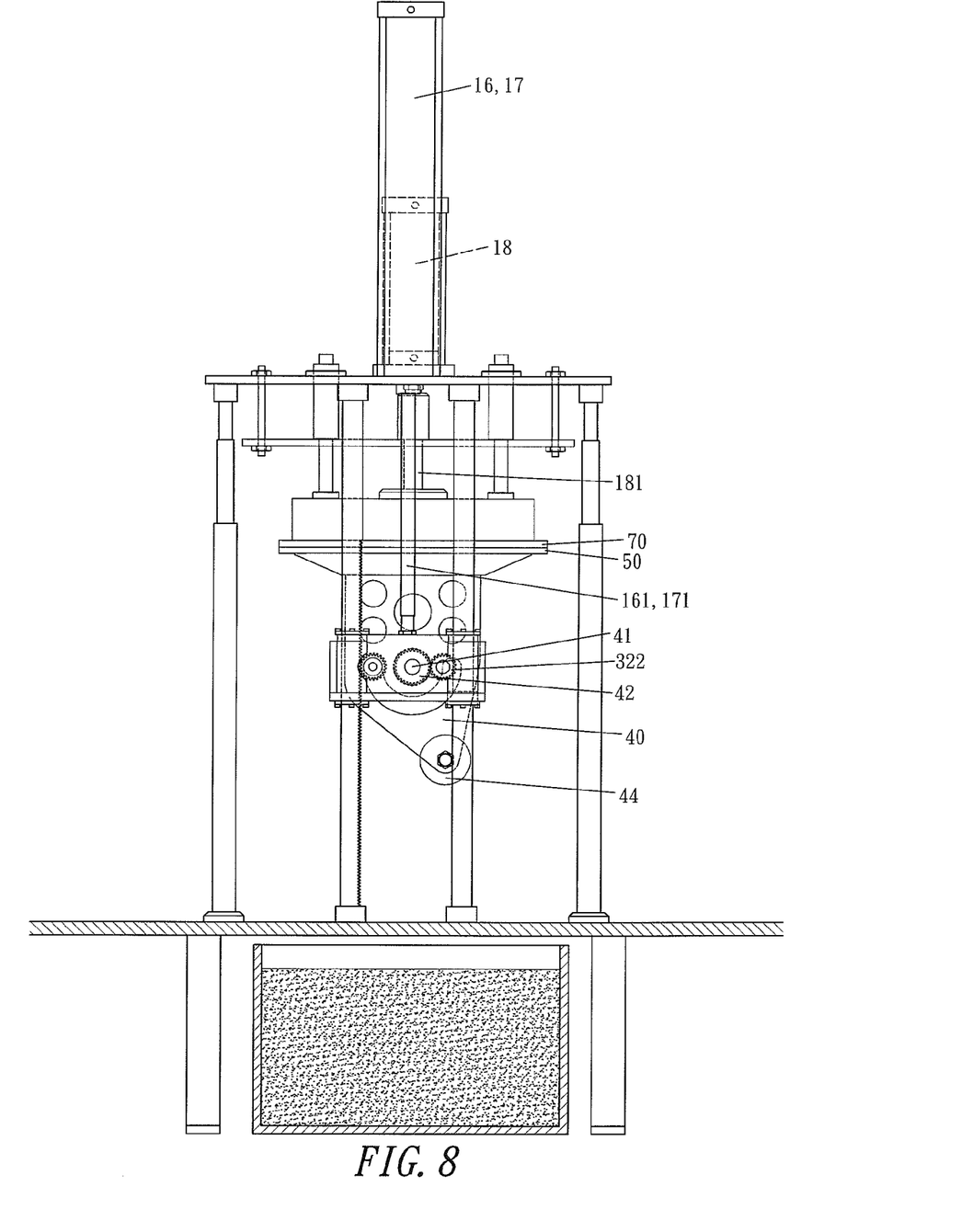
Figure 9:
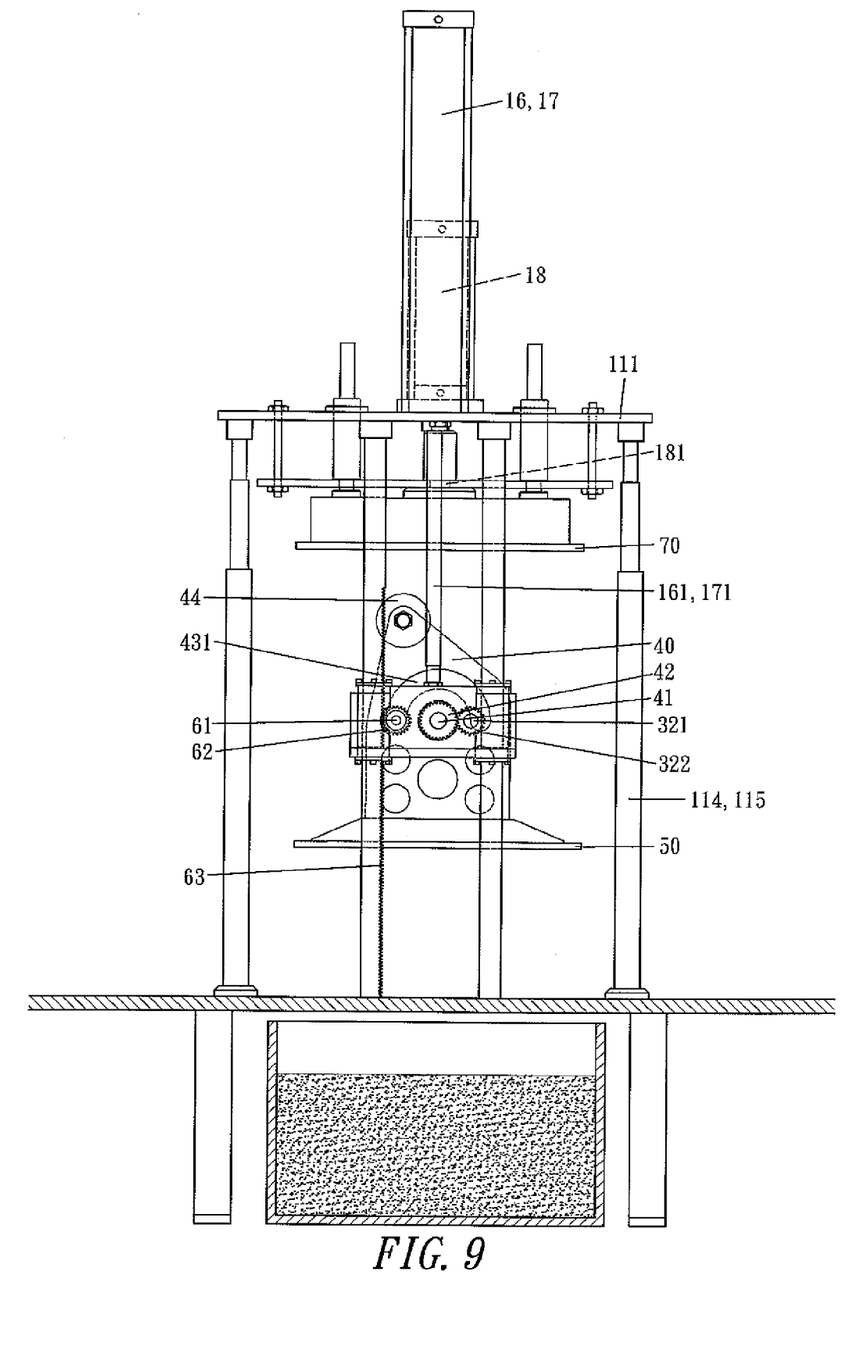

In FIG. 8, the whole action frame 40 (including the rotary shaft 41, the balance weight 44, the slurry suction die 50 and the slurry layer) is rotated and stopped until the slurry suction die 50 and the slurry layer face upward. During the process of rotation, a gravitational force of the balance weight 44 balances the vibration produced by the rotation of the slurry suction die 50, so that the rotation can be stopped precisely. The cylinder shafts 161, 171 of the front and rear power cylinders 16, 17 can be retracted immediately to drive the whole action frame 40 (including the rotary shaft 41, the balance weight 44, the slurry suction die 50 and the slurry layer) to ascend, and both of the slurry suction die 50 and the extrusion die 70 can be engaged precisely. A vacuum suction force introduced to the slurry suction die 50 and/or the extrusion die 70 can vacuum or remove the water moisture in the slurry layer quickly. The extrusion effect of the precise mold closing can squeeze or remove the extra water moisture in the slurry layer quickly, and the heating of the extrusion die 70 may be turned on selectively (depending on the dimensions or size of the product and the manufacturing time). In summation, the precise mold closing of the slurry suction die 50 and the extrusion die 70 provides a precise extrusion effect of the slurry layer, so that the blanks can be formed quickly, and so that the water moisture can be removed quickly. Thus, the manufacturing time for the later hot press truing process can be shortened to achieve the energy saving effect. In FIG. 9, the slurry suction die 50 sucks and descends the blank until the blank leaves the extrusion die 70. In the meantime, the extrusion die 70 is retracted by the cylinder shaft 181 of the power cylinder 18 to ascend and return to its original position. When the slurry suction die 50 descends, the power supply 31 of the turning mechanism 30 is turned on for a reverse rotation. Through the speed reducer 32, a force is outputted from the output gear 322 to drive the passive gear 42 to rotate in a reverse direction, to link the whole action frame 40 (including the rotary shaft 41, the balance weight 44 and the slurry suction die 50) to rotate clockwise. In the process, the accommodating arc slot 431 is rotated clockwise synchronously, but the righting shaft 61 remains in a still position. The righting shaft 61 is driven to descend, so that the righting gear 62 installed at an end of the righting shaft 61 is driven to descend along the righting rack 63 and rotate. With respect to the accommodating arc slot 431, the righting shaft 61 remains at a still position, and the rotation stops until the slurry suction die 50 (attaching a blank) faces downward. In the meantime, the balance weight 44 is rotated to return to its original position at the top, to complete one cycle of the slurry suction molding process.

After the slurry suction molding process is completed, the hot press truing process is performed immediately to change the blank into the molding product. A moving device installed in the side frame 20 is provided for driving a hot-press lower mold (which is also a moving mold) to move to a position precisely below the slurry suction die 50 and the blank. The front and rear power cylinders 16, 17 extend the cylinder shaft 161, 171 to drive the action frame 40 together with the slurry suction die 50 and the blank to descend, to put the blank into the hot-press lower mold (which is the moving mold). Then, the attaching force for the suction of the blank by the slurry suction die 50 is stopped, and an air blowing action is performed instead. Meanwhile, the attaching force by the hot-press lower mold (which is the moving mold) is provided to suck the blank, and the front and rear power cylinders 16, 17 retract the cylinder shafts 161, 171 to drive the action frame 40 together with the slurry suction die 50 to ascend to its original position (and the blank has been transferred to the moving mold), while the hot-press lower mold (which is the moving mold) is being moved to a position precisely below the hot-press upper mold which is installed at the top inside the side frame 20. Then, the hot-press upper mold is descended and engaged with the hot-press lower mold (which is the moving mold), and the heating of the blank is started to perform the hot press truing process, while maintaining the vacuum suction force of the hot-press lower mold to facilitate vacuuming and removing the steam and achieve a quick drying effect of the blank in order to dry and mold the blank quickly. As a result, the original blank with moisture is changed to a completely dry molding product. The heating of the hot-press upper mold is stopped, and the hot-press upper mold is driven to ascend to its original position. In the meantime, the moving mold sucks and moves the molding product towards the outside of the side frame 20 in order to collect the molding product.

In the assembly, the ascending action of the action frame 40 is driven by the cylinder shafts 161, 171 of the front and rear power cylinders 16, 17. In other words, it is necessary to start the front and rear power cylinders 16, 17 to retract or extend the cylinder shafts 161, 171 in order to drive the action frame 40 to ascend or descend. With the same technical principle, the mode of operation can be changed. The structure of the front and rear power cylinders 16, 17 can be skipped, and a motor device (such as a power supply equipped with a speed reducer) is used instead for rotating the righting shaft 61 in a forward or reverse direction. In other words, the righting gears 62 are rotated, so that the righting gears 62 are driven to ascend or descend along the righting shaft 61 to achieve the effect of driving the action frame 40 to complete the ascending action. In this mode of operation, the action frame 40 is turned over by turning on the power supply 31 of the turning mechanism 30. Through the speed reducer 32, a force is outputted from the output gear 322 to drive a passive gear 42 installed at the front end of the rotary shaft 41 to link the whole action frame 40 (including the rotary shaft 41, the balance weight 44 and the slurry suction die 50) to rotate.

The automated molding machine 1 as shown in FIG. 1 includes a side frame 20 disposed separately on both sides of the main frame 10 (in order words, a main frame 10 has two corresponding side frames 20), and each side frame 20 contains a means installed therein and provided for performing the hot press truing process. The two side frames 20 are installed in opposite directions to each other, so that the first blank produced after the slurry suction molding process taken place in the main frame 10 may be sent to the right (or left) side frame 20 for the hot press truing process. After the second blank is produced in the main frame 10, the second blank may be sent to the left (or right) side frame 20 for the hot press truing process. Therefore, the blanks produced in the main frame 10 may be sent from the right side or the left side into the side frame 20 sequentially for the hot press truing process to manufacture the molding products automatically and quickly. The aforementioned molding machine is applicable for the slurry suction molding process and hot press truing process and, particularly, for the manufacture of ultra small draft angle molding products. With the same technical principle, a main frame 10 may have one corresponding side frame 20. In other words, the blanks produced in the main frame 10 may be sent into a single side frame 20 (or the same side frame 20) for the hot press truing process.

From the description above, the present invention is characterized in that when the turning mechanism 30 is turned over, the righting gear 62 of the righting mechanism 60 is provided for assisting and righting the ascending or descending action along the righting rack 63 of the righting shaft 61, so that when the slurry suction die 50 is moved up and down or turned over, the righting gear 62 and the righting rack 63 assist righting the action, to achieve the effect of ascending or descending to a designated position precisely. When the slurry suction die 50 is driven to ascend to close with the extrusion die 70 or driven to descend to close with the moving mold, a precise mold closing can be achieved. In the design of the present invention, the power cylinder 18 extends the cylinder shaft 181 to push the extrusion die 70 to descend for a stroke to close mold with the ascending slurry suction die 50, to skip the stroke of moving the slurry suction die 50 and achieve the effects of reducing the manufacturing time and labor, lowering the manufacturing cost, and improving the yield rate and product competitiveness.

While the invention has been described by means of specific embodiments, numerous modifications and variations could be made thereto by those skilled in the art without departing from the scope and spirit of the invention set forth in the claims.

What is claimed is:

1. An automated molding machine for ultra small draft angle slurry molding products, comprising a main frame, a side frame disposed on a side of the main frame, first means installed in the main frame for performing a slurry suction molding process, and second means installed in the side frame for performing a hot press truing process, wherein a blank is formed after the slurry suction molding process is completed in the main frame, and then the blank is sent into the side frame for the hot press truing process, to manufacture a molding product; wherein the main frame has a top board, a working board, and a plurality of equidistant columns disposed between the top board and the working board for supporting and fixing a distance between the top and working boards to form an action space between the top board and the working board; wherein front and rear support columns are disposed on both front and rear sides of the action space respectively; wherein a front action base is passed between the front support columns; wherein a rear action base is passed between the rear support columns; wherein the working board has a hollow space at a top of the plurality of equidistant columns and a slurry box at the top of the plurality of equidistant columns; wherein a turning mechanism is mounted on an action plate fixed to a front side of the front action base, wherein the turning mechanism includes a power supply and a speed reducer installed on the action plate, wherein an output shaft of the speed reducer is passed into the front action base, wherein forces are outputted from an output gear; wherein an action frame is accommodated in the action space defined by the top board, the working board and the front and rear action bases, wherein the action frame includes a rotary shaft capable of rotating in forward and backward directions, wherein both front and rear ends of the rotary shaft are passed into the front and rear action bases and supported, wherein a passive gear is installed at the front end of the rotary shaft and engaged with the output gear inside the output gear for outputting forces to drive and rotate the rotary shaft and the action frame; wherein each of front and rear sides of the action frame is a panel having a symmetrical accommodating arc slot formed thereon, wherein the accommodating arc slots of the front and rear sides of the action frame are formed in an arc shape by using the rotary shaft as the center axis, wherein a slurry suction die is disposed on a surface on the panels of the first and rear sides of the action frame for guiding a vacuum suction force, and a balance weight is disposed on another surface of the first and rear sides of the action frame and configured in a same forward and backward directions and at an installation position having an inclination angle with respect to the rotary shaft; wherein a righting mechanism installed on the front and rear action bases includes a righting shaft on a side, wherein the righting shaft is passed through the symmetrical accommodating arc slots of the front and rear sides of the action frame, and both ends of the righting shaft are disposed at the front and rear action bases respectively, wherein a righting gear is installed separately at both ends of the righting shaft, and a righting rack in a vertical direction is disposed on a same side and faces a surface of the righting gear, wherein each righting gear is engaged with the corresponding righting rack, wherein when the front and rear action bases are driven to descend or ascend, the righting gears are also driven to descend or ascend synchronously; and wherein an extrusion die is installed in the action space defined by the top board, the working board and the front and rear action bases and disposed at a position adjacent to the top board.

2. The automated molding machine for ultra small draft angle slurry molding products according to claim 1, further comprising a front power cylinder and a rear power cylinder installed on a top surface of the top board, with the front and rear power cylinders having cylinder shafts passing downwardly through the top board and then being coupled to the front and rear action bases respectively, and wherein when the cylinder shafts of the front and rear power cylinders are extended or retracted synchronously, the front and rear action bases are driven to perform a descending or ascending action synchronously to achieve the effect of controlling the action frame to descend or ascend.

3. The automated molding machine for ultra small draft angle slurry molding products according to claim 1, further comprising a motor device for rotating the righting shaft in a forward or backward direction and linking the righting gears to rotate, wherein the righting gears are ascended or descended along the righting shaft to achieve the effect of controlling the action frame to descend or ascend.

4. The automated molding machine for ultra small draft angle slurry molding products according to claim 3, wherein the motor device is a power supply equipped with a speed reducer.

5. The automated molding machine for ultra small draft angle slurry molding products according to claim 1, wherein the extrusion die is coupled to a cylinder shaft of a power cylinder, wherein the power cylinder is installed at a top surface of the top board, and wherein the cylinder shaft of the power cylinder is passed downwardly through the top board and then coupled to the extrusion die to achieve the effect of controlling the extrusion die to descend or ascend.

6. The automated molding machine for ultra small draft angle slurry molding products according to claim 1, wherein a vacuum suction force is introduced to a surface of the extrusion die.

7. The automated molding machine for ultra small draft angle slurry molding products according to claim 1, wherein the extrusion die comprises a heater providing a heating effect.

* * * * *